United States Patent
Rath et al.

(10) Patent No.: US 12,393,359 B2
(45) Date of Patent: *Aug. 19, 2025

(54) EFFICIENT METHOD FOR DATA INVULNERABILITY ARCHITECTURE (DIA) AND DATA CORRUPTION DETECTION FOR DEDUPED CLOUD OBJECTS

(71) Applicant: Dell Products L.P., Round Rock, TX (US)

(72) Inventors: Jagannathdas Rath, Bengaluru (IN); Kalyan C. Gunda, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,591

(22) Filed: Apr. 25, 2024

(65) Prior Publication Data

US 2024/0295978 A1   Sep. 5, 2024

Related U.S. Application Data

(63) Continuation of application No. 17/813,994, filed on Jul. 21, 2022, now Pat. No. 12,118,223.

(51) Int. Cl.
*G06F 3/06* (2006.01)

(52) U.S. Cl.
CPC .......... *G06F 3/0641* (2013.01); *G06F 3/0619* (2013.01); *G06F 3/067* (2013.01)

(58) Field of Classification Search
CPC ....... G06F 3/0641; G06F 3/0619; G06F 3/067
See application file for complete search history.

(56) References Cited

U.S. PATENT DOCUMENTS

| | | |
|---|---|---|
| 10,083,059 B1 | 9/2018 | Singh et al. |
| 10,956,250 B1 | 3/2021 | Vig et al. |
| 11,403,000 B1 * | 8/2022 | Barker, Jr. ............ G06F 3/0664 |
| 2002/0169995 A1 | 11/2002 | Archibald et al. |
| 2011/0167221 A1 | 7/2011 | Pangal et al. |
| 2016/0026397 A1 | 1/2016 | Nishikido et al. |
| 2017/0220423 A1 | 8/2017 | Binford et al. |
| 2018/0060348 A1 | 3/2018 | Power et al. |
| 2018/0293139 A1 | 10/2018 | Defiebre et al. |
| 2018/0364917 A1 | 12/2018 | Ki et al. |

(Continued)

OTHER PUBLICATIONS

An article titled Checking object integrity in the Amazon Simple Storage Service (S3) User Guide documentation downloaded from archive.org Feb. 24, 2022. (Year: 2022).*

(Continued)

*Primary Examiner* — Tim T Vo
*Assistant Examiner* — Janice M. Girouard
(74) *Attorney, Agent, or Firm* — Workman Nydegger

(57) ABSTRACT

One example method includes receiving, at a cloud storage site, a write request that identifies an object to be written to the cloud storage site, storing the object at the cloud storage site, receiving, at the cloud storage site, a read request that identifies the object, performing, at the cloud storage site, an evaluation of the object to determine if the object is corrupted, and sending a message identifying an outcome of the evaluation. One or more of the operations at the cloud storage site may be performed by an Object Lambda function that has been configured by a dedupe application.

16 Claims, 3 Drawing Sheets

(56) References Cited

U.S. PATENT DOCUMENTS

| | | |
|---|---|---|
| 2019/0050266 A1 | 2/2019 | Gupta |
| 2020/0134215 A1 | 4/2020 | Natanzon et al. |
| 2020/0174886 A1 | 6/2020 | Li |
| 2021/0081271 A1 | 3/2021 | Doshi et al. |
| 2021/0216408 A1 | 7/2021 | Huskisson et al. |
| 2022/0019372 A1* | 1/2022 | Vastrad ............... G06F 11/2094 |
| 2022/0121376 A1 | 4/2022 | Rath et al. |
| 2022/0317909 A1 | 10/2022 | Gunda et al. |
| 2023/0185774 A1 | 6/2023 | Brand et al. |

OTHER PUBLICATIONS

An artiicle titled "Introducing Amazon S3 Object Lambda . . . " that discloses this allows a developer to add code to process data before returning the data to an application available in Amazon S3. (Year: 2021).*

UKIPO, Combined Search and Examination Report, mailed Jan. 11, 2024, from UK Pat. App. No. GB2310280.9.

* cited by examiner

EFFICIENT METHOD FOR DATA INVULNERABILITY ARCHITECTURE (DIA) AND DATA CORRUPTION DETECTION FOR DEDUPED CLOUD OBJECTS

FIELD OF THE INVENTION

Embodiments of the present invention generally relate to data storage at cloud sites. More particularly, at least some embodiments of the invention relate to systems, hardware, software, computer-readable media, and methods, for detecting and resolving corruption in cloud data.

BACKGROUND

In data deduplication, or 'dedupe,' systems, a file is split into segments and these segments are deduped across all files in the system. The segments are packed in regions and containers which are represented as objects in the active tier, or local tier on-premises for example. The segment sizes generally vary between 4KB-64KB and the container objects vary between 1MB-4MB and sometimes as large as 8MB, 16MB, for example, depending on the dedupe app.

With greater adoption of cloud storage, dedupe servers/apps allow moving dedupe container objects to the cloud for long term retention (LTR). The dedupe ratio, object sizes, and other parameters, may vary in the cloud tier though. For example, Dell Power Protect-based Data Domain systems support object sizes of 1MB in public cloud providers and 4.5 MB in private cloud providers. The data/objects are moved by the dedupe app based on various policies and configurations such as, for example, "move all the data older than 2 weeks to the cloud."

Many times however, due to various reasons such as software bugs, hardware issues, bad disk sectors, or disk failures, at the cloud storage provider end, silent data corruption of these cloud objects can occur. Because the corruption is silent, the customer may not become aware of a problem that has occurred with its data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
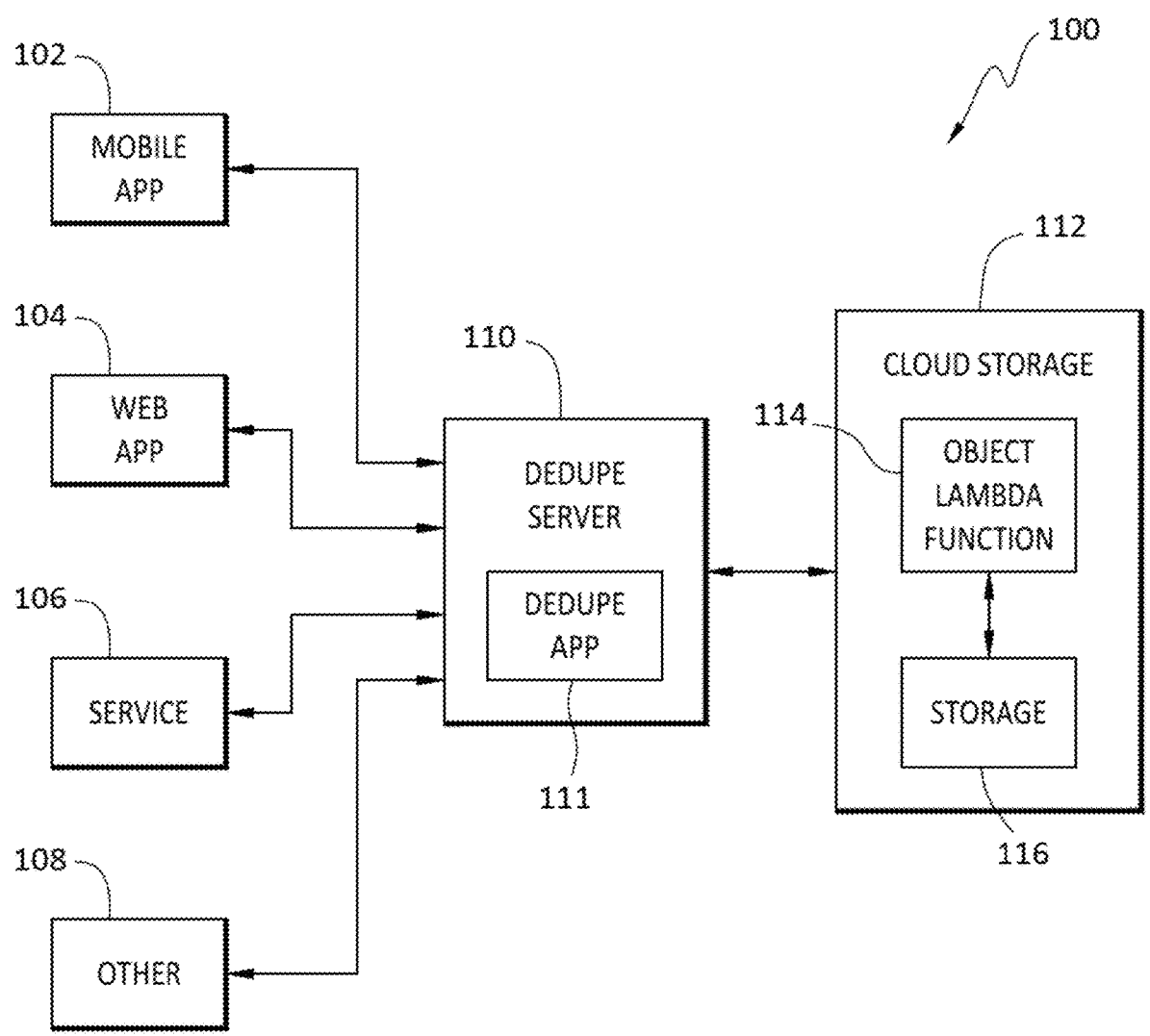
FIG. 1 discloses aspects of an example operating environment and architecture according to some embodiments.

Embodiments of the present invention generally relate to data storage at cloud sites. More particularly, at least some embodiments of the invention relate to systems, hardware, software, computer-readable media, and methods, for detecting and resolving corruption in cloud data.

In general, example embodiments of the invention comprise methods to detect corruption in cloud objects without the dedupe system having to implement any complex code and logic. This approach takes the whole process to a relatively simple form, while following a write-read-verify-fix approach.

In one example embodiment, a dedupe system, which may be hosted on-prem, at a cloud storage site, or elsewhere, may configure an object attached cloud function, such as the AWS Object Lambda for example, in the cloud that may later be triggered by a simple GET (HTTP command to read or receive a resource such as an object) call for each object.

In the dedupe app WRITE I/O Path, once a PUT (HTTP command to write or update a resource such as an object) operation completes successfully without any errors, the dedupe app may then: (a) issue a GET request through an Object Lambda endpoint for the same object that was written, which may then; (b) trigger the lambda function in the cloud, which may validate the object date and send the appropriate response back to the dedupe app; and (c) if the response received by the dedupe app from the cloud is success ("All OK"), then the write may be marked as complete; or (d) on the other hand, if the dedupe receives a 'failure' response from the cloud, then the dedupe app may issue a re-write of the same object again—the re-write will again go through the same validation process via a GET, but if the validation fails repeatedly for certain number of times, 2× or 3× for example, then the write operation may be marked as 'failed.'

With this approach, the write operation workflow in the dedupe app may remain exactly the same as for the on-prem storage. Every write may be verified for correctness immediately by a read, by issuing a specialized GET operation instead of a regular GET operation.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an advantageous aspect one embodiment of the invention is that a customer may be assured that an object was written correctly to the cloud and no corruption occurred during the write process. If corruption did occur, the customer may be made aware at the time of the write, rather than finding out later, or never. As another example, an embodiment may ensure that there is no cloud egress cost involved, since no data is sent back from the cloud to the dedupe app. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Context for Some Example Embodiments

When data is moved to the cloud, the dedupe application typically relies on a response of the cloud tier to ensure that the data is successfully written in the cloud storage. But data can be corrupted over the wire, that is, as the data travels to the cloud, or the data writes can be dropped at the cloud, or written incorrectly in the disks due to service provider software bugs, or hardware issues, for example. If there were issues in writing the data correctly, then the problem(s) likely will not be detected until the data is accessed again some time in the future. Thus, many weeks, or months, or even years, may elapse before the problem is discovered, by which time it would be difficult or impossible to take any corrective action to recover the correct data.

One of the ways dedupe applications attempt solve this problem, on-prem at least, is by doing a read-verify on write. Data that is written is then read back and verified to ensure validity and correctness. In case of issues, the data can be written again, or an error can be flagged so that issues are discovered closer to the point of origin of the problem.

In a cloud storage context however, this approach is not feasible. For example, the latency and cost involved in doing a read-verify inline makes this operation prohibitive. To illustrate, 100GB of write would require 100GB of read to be done from outside the cloud, which would incur significant egress costs.

As another example, many cloud storage providers also support upload content verification via checksums provided by clients in the REST headers. The object will be created in the cloud only if the checksum sent by client matches the one calculated by the cloud storage software for the data that was received by the cloud. While this approach may be able to identify corruptions in the network transfer of the data, it cannot detect corruptions, such as due to software bugs, hardware issues in the cloud storage provider, that can take place while the object is written to the cloud storage disks. Moreover, since a checksum must be calculated by the dedupe application, additional processing costs are incurred for this approach.

Moreover, many cloud storage providers generate a checksum of the object and store it in the object metadata, sometimes referred to as E-tags, or MD5. These are typically checksums calculated on the data before the data is written to the disks. Again however, there may be silent errors occurring during writes and the checksum of the object actually written will be different from this E-tag or checksum that was calculated prior to the write. Further, there is no way of validating this, that is determining that an error has occurred, other than reading from the cloud, which is time and cost prohibitive.

A somewhat improved approach may be for dedupe apps to use regular lambda function/cloud functions or even spawn cloud VM or Container instances to detect the integrity of the data written. But, these approaches are problematic as well. For example, using regular lambda or cloud functions would require more management logic to be implemented in the dedupe application and would deviate from the regular write-read-verify-fix process flow. Moreover, lambda functions execute for some maximum time limit, such as 15 minutes for example. Consequently, batches of objects can only be verified by each lambda invocation, leading to management overhead of thousands, or more, of lambda function calls, and their error handling and retry in the event that a problem is discovered.

C. Aspects of Some Example Embodiments

With reference now to FIG. 1, details are provided concerning one example operating environment 100 for some embodiments of the invention. In general, various clients 102, 104, 106, and 108, may include one or more applications that generate new, and/or modified data that is desired to be protected. The clients that host the applications may comprise, for example, a mobile device, an on-premises site, and/or any other type of host.

The clients 102, 104, 106, and 108, may communicate data to a dedupe server 110, which may comprise a dedupe application 111, or 'dedupe app,' that may operate to create deduplicated backups of the data. Data in the backups may be transmitted to a cloud storage site 112 for storage. As part of the storage process, a Object Lambda function 114 may be invoked, such as by way of a read or GET issued by the dedupe server 110. In general, and as discussed in further detail below, the lambda function 114, an example of which is the 'Object Lambda' supported by AWS (Amazon Web Services), may operate to check, in response to a command from the dedupe app 111, for data corruption before, during, and/or after, data is written to storage 116. In at least some embodiments, the dedupe application 111 hosted at the dedupe server 110 may operate to configure the Object Lambda function 114.

Recently, providers such as AWS have started supporting Object Lambda. In this approach, any GET request, such as may be issued by the dedupe app 111, performed by way of the Object Lambda endpoint, which may be a different endpoint than the regular Amazon S3 I/O endpoint, may trigger a pre-configured Object Lambda function, such as the lambda function 114 for example, to parse, process or modify the data in the object and send back the modified data, or any other response. The object data may be made available to the lambda function 114 automatically when the lambda function 114 is triggered.

Because the lambda function 114 may run at the cloud storage site 112, the customer whose data is processed by the lambda function 114 may realize significant cost savings. For example, it may be significantly less expensive to process the data at the cloud storage site 112, as compared with a situation where the data has to be downloaded from the cloud storage site 112 to the customer site, or client, and then processed.

Example embodiments embrace, among other things, methods and operations for a dedupe system, such as the dedupe server 110, to configure such an Object Lambda (OL) function in the cloud. The OL function may be configured to be triggered, or instantiated, in response to a simple GET call issued by the dedupe system to the cloud storage site 112 for one or more objects stored at the cloud storage site 112.

The dedupe app 111 may also send any required values that may be expected by the lambda function 114, such as, but not limited to, a checksum, expected number of data sections, information about regions, sections, and/or blocks, to the lambda function 114. Any of these values and information may be include in the GET, request itself. The information and values sent by the dedupe app 111 may vary depending on the dedupe app 111 and the way the dedupe app 111 stores data at the cloud storage site 112, and/or may also depend on how well equipped is the lambda function 114 to detect corruption in the object data. Depending upon the embodiment, the information sent in a PUT or GET request by the dedupe app 111 may be as simple as a checksum of the full data that was calculated by the dedupe app 111 before the data was sent to the cloud storage site 112.

C.1 Example Lambda Function Operations

A lambda function employed in some example embodiments, such as the Object Lambda function 114 for example, may comprise logic executable to analyze object data, and to perform all the validation steps that may be needed to verify the correctness of the object data. Thus, such logic may include logic to parse the layout in which data is stored in the objects, and logic to parse object metadata, for example.

The nature of the logic included in the lambda function 114 may vary. For example, the logic may operate to simply generate a checksum of the data received at the cloud storage site 112, and matching the calculated checksum with a checksum sent by the dedupe app 111. In another embodiment, the lambda function 114 may comprise logic that is executable to parse the object metadata to obtain information and insights about the object.

When a cloud object, that is, an object residing at and/or stored in, a cloud storage site 112, is corrupted, it may be likely that at least 1 bit of the whole metadata area for that object is also corrupt. When an embodiment detects the corrupted bit, then the associated object may be deemed to be corrupt. Note that data verification for an object may be performed, even if all the metadata for that object are found to be valid. If the lambda function 114 finds both the data and metadata correct, then the lambda function 114 may send back, to the dedupe app 111, a success code and empty body as result. An example of such a communication from the lambda function 114 to the dedupe app 111 may take the form '200 OK and ""[as the message body].'

On the other hand, if the logic of the lambda function 114 detects corruption in the object and/or object metadata, then the lambda function 114 may send back, to the dedupe app 111, a failure error code and the response body may also contain any relevant info for the detected corruptions, such as, for example, offset of the corruption, and a size of each corrupt area. An example of such a communication from the lambda function 114 to the dedupe app 111 may take the form '403 NOT OK' and '<0, 100><400,50>' [offset, size].

The dedupe app 111 may also choose to make the lambda function 114 return an empty response body in case of corruption as well. However, the failure error code may be mandatory for return to the dedupe app 111, in any case.

C.2 Example Dedupe App Operations

In the dedupe app 111 WRITE I/O path, once the PUT operation completes successfully, that is, without any errors—note that the object may be successfully stored even if it is corrupted—then:
  a. the dedupe app 111 may issue a GET request through the Object Lambda endpoint for the same object that was written-note that the GET request may not be issued through, for example, a regular S3 I/O endpoint;
  b. the GET request may trigger the lambda function 114 at the cloud storage site 112, which may validate the object data and send the appropriate response back to the dedupe app 111;
  C. if the response received by the dedupe app 111 from the lambda function 114 is success ("All OK"), then nothing further may be required, and the write may be marked as complete; or
  d. if the dedupe app 111 receives a failure response from the lambda function 114, then the dedupe app 111 may issue a re-write of the same object again, or restart the write operation from the beginning-then, this write will again go through the same validation process as with a GET operation, and if the validation of the object/metadata by the lambda function 114 fails repeatedly for a specified number of times, such as 2× or 3× for example, then the write operation may be marked as failed.

C.3 Additional Considerations For Example Embodiments

In the operation of the example embodiments disclosed herein, the write operation workflow in the dedupe app 111 may remain the same as for the on-prem storage. For example, every write may be verified for correctness immediately by a read, by issuing a specialized GET operation instead of the regular GET operation. And due to that, there is no cloud egress cost involved as no data may ever be sent back from the cloud storage site 112 to the dedupe app 111 when example embodiments are performed. Moreover, the disclosed methods according to some embodiments may be implemented outside a write operation, in the form of a stand-alone utility that may be operable to detect data corruption by triggering the same Object Lambda.

Note that example embodiments, which may employ a lambda function 114, such as the AWS Object Lambda, may thus differ from approaches that may employ a conventional lambda function. For example, with regular lambda functions, the dedupe application needs to implement additional logic in code to be able to trigger lambda functions, fetch their results, error states, and retry them. These operations may implicate a completely different set of cloud provider APIs that impose their management overhead. In contrast, example embodiments of the invention, by using an approach such as the Object Lambda function, do not require the dedupe application to implement any of such operations. Instead, example embodiments may operate to simply trigger the lambda function 114 with a GET operation, and may use a different endpoint URI, such as Object Lambda URI for example. Thus, the approach implemented by some example embodiments may make it much simpler for the dedupe app 111 to trigger, fetch status, and obtain results, for example, concerning objects that are stored at the cloud storage site 112.

D. Further Discussion

As will be apparent from this disclosure, example embodiments of the invention may possess various useful features and advantages. For example, an embodiment may obviate the need to read data, which may be measured in TBs or PBs for example, from a cloud storage site in order to identify and resolve data corruptions. Thus, such embodiments may eliminate the costly egress charges associated with reading data out of a cloud storage site.

As another example, data verification, to identify any corruption, may be done in the I/O path of the write itself. This approach, implemented by example embodiments with respect to writes to cloud storage, may be similar or identical to an approach presently used on-prem, namely, Write-Read-Verify-Fix.

Further, in an embodiment, validation of the data may be outsourced to the cloud storage site, such as a lambda function for example. As such, embodiments may reduce the number of CPU cycles required by storage systems such as Dell Data Domain (DD).

In an embodiment, data corruption during write may be caught right there during the write process at a cloud storage site. As a result, embodiments may provide an opportunity to correct corrupted data by fix that corrupted data using re-writes performed at the cloud storage site.

Finally, the example methods according to some embodiments may be implemented outside a write operation, in the form of a stand-alone utility which may, but need not, be executed at WRITE or PUT time to detect data corruption as well. That is, the stand-alone utility may be invoked at any time, and not just in connection with WRITE or PUT operations, after the data has been received at the cloud storage site.

E. Example Methods

Figure 2:
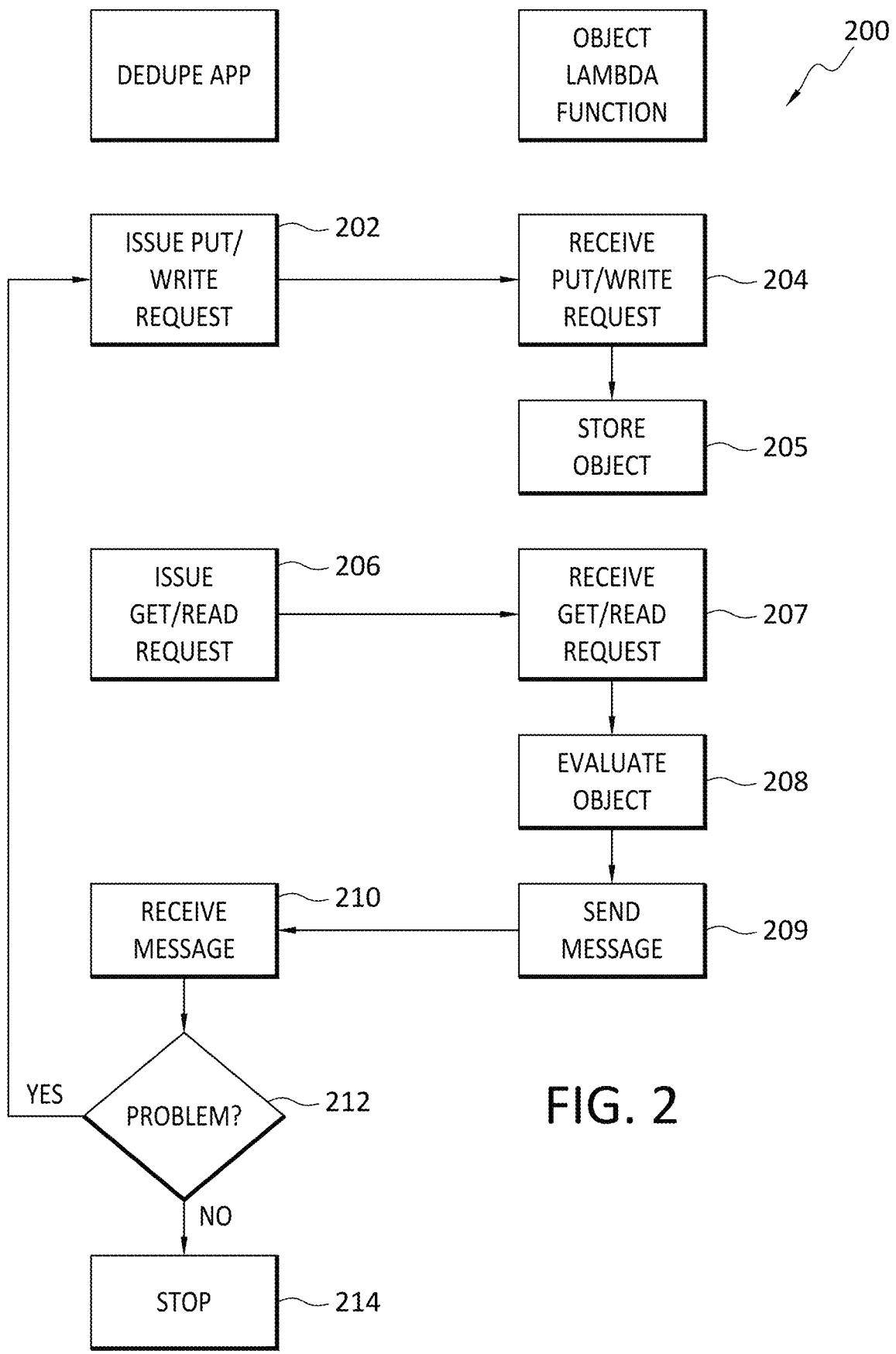
FIG. 2 discloses aspects of an example method according to some embodiments.

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method 200 is disclosed according to some embodiments of the invention. As disclosed there, the method 200 may be collectively performed by a dedupe application, and a lambda function hosted at a cloud storage site.

The method 200 may begin when a dedupe application issues a PUT or WRITE request that identifies, and includes, an object to be stored, such as at a cloud storage site for example. The object identified in the request may be an object that has been deduped. The PUT or WRITE request may be received 204, either directly or indirectly, by a lambda function hosted at a cloud storage site. Note that a PUT request and a WRITE request may be generically referred to herein as examples of a 'write request.'

After receipt 204 of the request, the cloud storage may store 205 the object that was identified in the write request. The PUT operation in the cloud storage may return, to the dedupe app, a response code indicating whether the PUT was successful or not, if the write itself was not successful.

At some point after the object has been stored 205, possibly immediately after the object has been stored 205, the dedupe app may issue 206 a GET or READ request. Note that a GET request and a READ request may be generically referred to herein as examples of a 'read request.' The read request may be issued 206 immediately after the dedupe app receives a confirmation from the cloud storage that the object identified in the write request has been stored 205. In particular, the read may be triggered immediately once the PUT completes successfully, that is, the read may be triggered before the dedupe app acknowledges the write back to the App.

The read request may then be received 207 by the Object Lambda function, which may then evaluate 208 the identified object, and/or the metadata of that object. Note that the evaluation 208 may be triggered by, and performed in response to, the issue 206 of the read request. Thus, the dedupe app may not have to affirmatively request the evaluation 208 but, instead, the evaluation 208 may be performed automatically by the lambda function in response to the issue 206 of the read request by the dedupe app. Note that the operations performed by the lambda function, as well as the trigger relationship, may be configured initially by the dedupe app. In this way, the dedupe app may ensure that the lambda function properly handles GET/READ requests issued by the dedupe app. The evaluation 208 may be performed before, during, or after, storage of the object at the cloud storage site that hosts the lambda function.

The evaluation 206 performed by the lambda function may comprise determining whether or not the object and/or its object metadata identified in the PUT or WRITE request that was issued 202 is corrupted. The determination as to whether or not the object and/or its metadata are corrupted may be as simple as calculating a checksum for the object that was received at 204, and comparing that checksum with a checksum provided, possibly in the GET or READ request, by the dedupe app. In this example, if the checksums match, then the object/metadata may be deemed not corrupted, and if the checksums do not match, then the object/metadata may be deemed corrupted. In either case however, the lambda function may send a message 209 back to the dedupe app that indicates the outcome of the evaluation 206, and which may include information related to that evaluation 206.

The dedupe app may receive 210 the message and parse the message to determine 212 if the lambda function has identified a problem with the object/metadata identified in the issued 202 PUT or WRITE request. If the message indicates a problem, such as that the object and/or its metadata are corrupted, the method may return to 202 any number 'X' of times until the problem is resolved, or until the number 'X' of iterations is performed. On the other hand, if the message is determined 212 to indicate that the object/metadata are not corrupted, the method 200 may stop 214.

F. Further Example Embodiments

Following are some further example embodiments of the invention. These are presented only by way of example and are not intended to limit the scope of the invention in any way.

Embodiment 1. A method, comprising: receiving, at a cloud storage site, a write request that identifies an object to be written to the cloud storage site; storing the object at the cloud storage site; receiving, at the cloud storage site, a read request that identifies the object; performing, at the cloud storage site, an evaluation of the object to determine if the object is corrupted; and sending a message identifying an outcome of the evaluation.

Embodiment 2. The method as recited in embodiment 1, wherein the write request and the read request are received from a dedupe application, and the message is sent from the cloud storage site to the dedupe application.

Embodiment 3. The method as recited in any of embodiments 1-2, wherein the performing of the evaluation is carried out by an Object Lambda function hosted at the cloud storage site.

Embodiment 4. The method as recited in embodiment 3, wherein operation of the lambda function is automatically triggered by receipt, at the cloud storage site, of the read request.

Embodiment 5. The method as recited in any of embodiments 1-4, wherein the message indicates either that the object is corrupted, or that the object is not corrupted.

Embodiment 6. The method as recited in any of embodiments 1-5, wherein when the evaluation indicates that the object is not corrupted, a write operation for the object is marked as complete.

Embodiment 7. The method as recited in any of embodiments 1-6, wherein a lambda function that carries out the evaluation is configured by the dedupe application.

Embodiment 8. The method as recited in any of embodiments 1-7, wherein a configuration of the lambda function is determined based on a requirement of the dedupe application.

Embodiment 9. The method as recited in any of embodiments 1-8, wherein the object is deduplicated prior to being stored at the cloud storage site.

Embodiment 10. The method as recited in any of embodiments 1-9, wherein no data is downloaded from the cloud storage site by the dedupe application.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
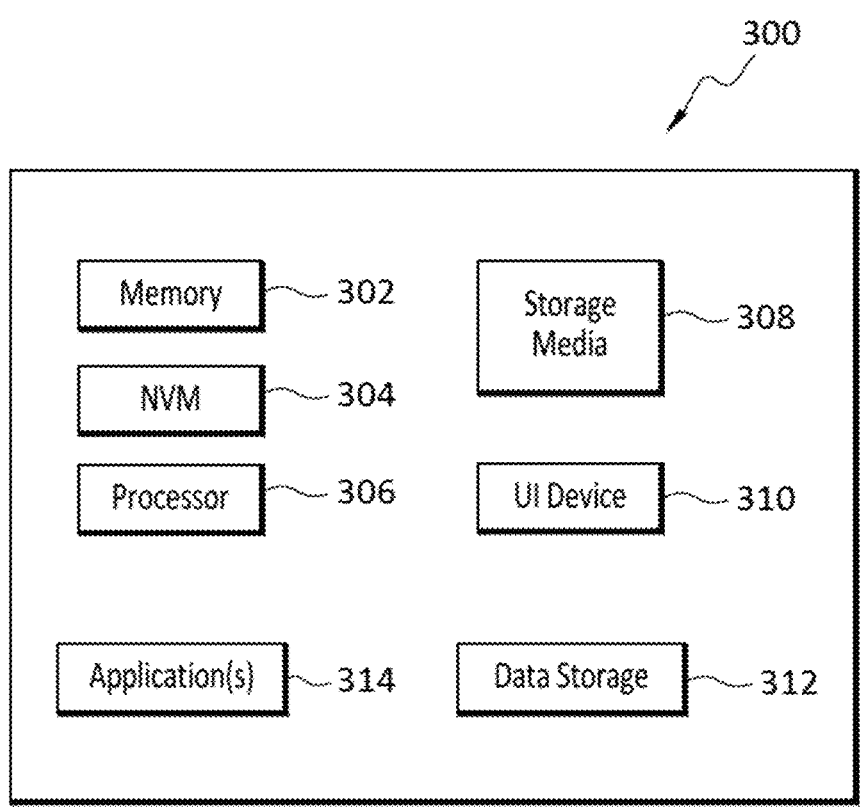
FIG. 3 discloses aspects of an example computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   transmitting, by a dedupe application, a write request to a cloud storage site, and the write request identifies an object to be stored at the cloud storage site;
   configuring, by the dedupe application, an Object Lambda function at the cloud storage site to perform an evaluation of the object, and the Object Lambda function, as configured by the dedupe application, includes logic to iterate, parse, and validate, data in the object, and a configuration of the Object Lambda function is determined based on a requirement of the dedupe application;

issuing, by the dedupe application to the cloud storage site, a read request directed to the object;

receiving, by the dedupe application from the cloud storage site, a message, and the message indicates that the evaluation of the object has been performed by the cloud storage site, and the message also indicates an outcome of the evaluation;

when the message indicates a problem with the object, one or more additional write requests are issued by the dedupe application to the cloud storage site until either 'X' additional write requests have been made, where 'X' is a specified integer that is equal to, or greater than, one, or the problem has been resolved, whichever occurs first; and when the message does not indicate a problem with the object, no further write requests are issued by the dedupe application to the cloud storage site.

2. The method as recited in claim 1, wherein the evaluation comprises a comparison of a checksum calculated for the object as received from the dedupe application and a checksum provided by the dedupe application in the read request.

3. The method as recited in claim 1, wherein the evaluation indicates whether or not the object has been corrupted.

4. The method as recited in claim 1, wherein the write request identifies object metadata to be stored at the cloud storage site.

5. The method as recited in claim 1, wherein the message indicates that an evaluation of object metadata has been performed by the cloud storage site.

6. The method as recited in claim 1, wherein the evaluation was carried out by an Object Lambda function hosted at the cloud storage site.

7. The method as recited in claim 1, wherein performance of the evaluation is automatically triggered by receipt, at the cloud storage site, of the read request.

8. The method as recited in claim 1, wherein no data is downloaded from the cloud storage site by the dedupe application.

9. A non-transitory storage medium having stored therein instructions that are executable by one or more hardware processors to perform operations comprising:

transmitting, by a dedupe application, a write request to a cloud storage site, and the write request identifies an object to be stored at the cloud storage site;

configuring, by the dedupe application, an Object Lambda function at the cloud storage site to perform an evaluation of the object, and the Object Lambda function, as configured by the dedupe application, includes logic to iterate, parse, and validate, data in the object, and a configuration of the Object Lambda function is determined based on a requirement of the dedupe application;

issuing, by the dedupe application to the cloud storage site, a read request directed to the object;

receiving, by the dedupe application from the cloud storage site, a message, and the message indicates that the evaluation of the object has been performed by the cloud storage site, and the message also indicates an outcome of the evaluation;

when the message indicates a problem with the object, one or more additional write requests are issued by the dedupe application to the cloud storage site until either 'X' additional write requests have been made, where 'X' is a specified integer that is equal to, or greater than, one, or the problem has been resolved, whichever occurs first; and when the message does not indicate a problem with the object, no further write requests are issued by the dedupe application to the cloud storage site.

10. The non-transitory storage medium as recited in claim 9, wherein the evaluation comprises a comparison of a checksum calculated for the object as received from the dedupe application and a checksum provided by the dedupe application in the read request.

11. The non-transitory storage medium as recited in claim 9, wherein the evaluation indicates whether or not the object has been corrupted.

12. The non-transitory storage medium as recited in claim 9, wherein the write request identifies object metadata to be stored at the cloud storage site.

13. The non-transitory storage medium as recited in claim 9, wherein the message indicates that an evaluation of object metadata has been performed by the cloud storage site.

14. The non-transitory storage medium as recited in claim 9, wherein the evaluation was carried out by an Object Lambda function hosted at the cloud storage site.

15. The non-transitory storage medium as recited in claim 9, wherein performance of the evaluation is automatically triggered by receipt, at the cloud storage site, of the read request.

16. The non-transitory storage medium as recited in claim 9, wherein no data is downloaded from the cloud storage site by the dedupe application.

* * * * *